United States Patent
Patel et al.

(10) Patent No.: US 9,853,904 B2
(45) Date of Patent: Dec. 26, 2017

(54) SOURCE-BASED QUEUE SELECTION MECHANISM IN THE ROUTING ENVIRONMENT

(75) Inventors: Nirmesh Patel, Ottawa (CA); Erel Ortacdag, Ottawa (CA)

(73) Assignee: Alcatel Lucent, Boulogne-Billancourt (FR)

(*) Notice: Subject to any disclaimer, the term of this patent is extended or adjusted under 35 U.S.C. 154(b) by 237 days.

(21) Appl. No.: 12/659,032

(22) Filed: Feb. 23, 2010

(65) Prior Publication Data

US 2011/0206046 A1   Aug. 25, 2011

(51) Int. Cl.
*H04L 12/28* (2006.01)
*H04L 12/56* (2006.01)
*H04L 12/851* (2013.01)
*H04L 12/863* (2013.01)

(52) U.S. Cl.
CPC ............ *H04L 47/24* (2013.01); *H04L 47/621* (2013.01)

(58) Field of Classification Search
CPC .............................. H04L 47/24; H04L 47/621
USPC .................. 370/412–419, 230, 229
See application file for complete search history.

(56) References Cited

U.S. PATENT DOCUMENTS

| | | | |
|---|---|---|---|
| 5,784,357 A | 7/1998 | Woelker | |
| 6,847,645 B1* | 1/2005 | Potter et al. | 370/392 |
| 6,973,093 B1* | 12/2005 | Briddell et al. | 370/421 |
| 6,975,638 B1* | 12/2005 | Chen et al. | 370/412 |
| 7,035,212 B1* | 4/2006 | Mittal et al. | 370/230 |
| 7,760,735 B1* | 7/2010 | Chen et al. | 370/392 |
| 2002/0181484 A1* | 12/2002 | Aimoto | H04L 49/1553 370/413 |
| 2003/0081624 A1 | 5/2003 | Aggarwal et al. | |
| 2004/0114583 A1* | 6/2004 | Cetin et al. | 370/360 |
| 2004/0153570 A1* | 8/2004 | Shobatake | 709/238 |
| 2005/0135356 A1* | 6/2005 | Muthukrishnan et al. | 370/389 |
| 2006/0067349 A1 | 3/2006 | Ronciak et al. | |
| 2006/0159088 A1* | 7/2006 | Aghvami et al. | 370/389 |
| 2007/0147320 A1* | 6/2007 | Sattari et al. | 370/338 |
| 2011/0122883 A1* | 5/2011 | Pacella | H04L 49/9005 370/412 |
| 2014/0219288 A1* | 8/2014 | Aimoto | H04L 47/10 370/412 |

FOREIGN PATENT DOCUMENTS

| | | |
|---|---|---|
| JP | 2000349765 | 12/2000 |
| JP | 2006094304 | 4/2006 |

OTHER PUBLICATIONS

H. Tang, I Lambadaris: "Noval Bandwidth Allocation Scheme for Ring Networks with Spatial Reuse", 2002, pp. 162-168.
H. Tang, I Lambadaris: "Performace Evaluation of a New Fairness Control Scheme for Ring Networks with Spatial Reusese" 2003, pp. 143-153.

(Continued)

*Primary Examiner* — Chuong T Ho
(74) *Attorney, Agent, or Firm* — Kramer & Amado, P.C.

(57) ABSTRACT

The invention is directed to a method and system for selecting queues for source-based queuing in a packet router, requiring only one flow per destination route. The invention stores source interface information for each packet while it is being processed. The invention applies to packet routers including IP routers, Ethernet routers and Label Switched Routers (LSR).

18 Claims, 4 Drawing Sheets

(56) References Cited

OTHER PUBLICATIONS

International Search Report for PCT/IB2011/000472 dated Jul. 6, 2011.
Japanese Office Action dated Sep. 3, 2013 in Japanese Patent Appl. No. 2012-554442.
Chinese Office Action dated Oct. 20, 2014, in CN 201180008559.3 (with translation).

* cited by examiner

SOURCE-BASED QUEUE SELECTION MECHANISM IN THE ROUTING ENVIRONMENT

FIELD OF THE INVENTION

The invention is directed to packet switching communication networks, and more particularly, to queuing techniques in access routers.

BACKGROUND OF THE INVENTION

In network processor-based Internet Protocol (IP) routers, queuing functionality of traffic management is usually carried out per destination interface. When source-based queuing is required in the router, such as when the router is used at the customer edge and ports are connected to the access side, known solutions define flows per source interface and per destination route in order to associate the queues with the source interface. A flow is a stream of data with the same traffic management characteristics such as a destination IP route (e.g.: 2.2.2.2/24, representing a group of IP addresses having the first 24 bits in common) or a specific destination IP address (e.g.: 1.1.1.1) or destination MAC address in VPLS (Virtual Private LAN Service, RFC2547) or MPLS label in the LSR (Label Switch Router, RFC3032).

Another known alternative is to have routing data path lookups performed after source based queuing. Both approaches require flows per sources and per destination. Performing queuing functionality per source typically requires significant resources as flows per source need to be created for each destination, resulting in a large context table in memory and therefore consuming large amounts of memory which can be expensive, either in terms of the cost of the memory or reduced performance as memory resources are exhausted in use.

Figure one illustrates any prior art source base queuing implementation

With reference to figure one ports 101, 103 can be configured with one or more ingress interfaces 105, 107, 109. IP packets from each ingress interface are directed to separate flows. For example IP packets 111, 113, 115 from ingress interfaces 105, 107, 109 respectively are directed to flows 117, 119, 121. For source based queuing, IP packets 123, 125, 127, 129 originating from ingress interface 105 are forwarded to queue set 131. Queues 133, 135, 137 within queue set 131 are each configured to handle traffic with different priorities. The queues are processed according to the down stream bandwidth through the switching fabric 139.

Therefore, a means of minimizing memory usage while maintaining routing and queuing performance remains highly desirable.

SUMMARY OF THE INVENTION

In one embodiment, the invention provides a method for selecting queues in a packet router. The method comprises steps of: receiving a data packet from an ingress interface; storing an identifier for said ingress interface associated with said data packet in said flow; directing said data packet to a flow according to the destination address of said data packet; forwarding said data packet from said flow to a set of queues associated with said ingress interface according to the stored identifier.

Other embodiments further comprise a step of assigning said data packet to a queue within said set of queues according to a priority of said data packet wherein said queue corresponds to said priority.

In other embodiments the step of storing said identifier comprises storing said identifier in an internal register allocated to said data packet within said flow.

In other embodiments the step of storing said identifier comprises storing said identifier in external memory allocated to said data packet within said flow.

In other embodiments the step of storing said identifier comprises pre-pending said identifier to said data packet in an encapsulation header.

In other embodiments the priority is defined by a Quality of Service (QoS) parameter in said data packet.

In other embodiments the priority is defined by a forwarding class parameter in said data packet.

In other embodiments the internal register allocated to said flow while said data packet is present within said flow.

In other embodiments the destination address comprises a range of destination addresses.

In other embodiments the packet router comprises an IP router and said data packet comprises an Internet Protocol (IP) packet.

In other embodiments the packet router comprises an Ethernet router, said data packet comprises an Ethernet packet and said destination address comprises a destination MAC address.

In other embodiments the packet router comprises a Label Switched Router (LSR) and said data packet comprises a MultiProtocol Label Switching (MPLS) packet and said destination address comprises an MPLS label.

Another aspect of embodiments of the present invention provide a system for processing incoming packets in a packet router. The system comprises: an ingress interface for receiving a data packet, the ingress interface having an ingress interface identifier; a storing means for storing said ingress interface identifier in association with said data packet in said flow; a flow for accepting said data packet from said interface; wherein said flow is associated with a destination address of said data packet; a forwarding means for forwarding said data packet from said flow to a set of queues associated with said ingress interface according to the stored identifier.

In some embodiments the forwarding means is configured to assign said data packet to a queue within said set of queues according to a priority of said data packet wherein said queue corresponds to said priority.

In some embodiments the storing means comprises an internal register allocated to said data packet within said flow.

In some embodiments the storing means comprises an external memory allocated to said data packet within said flow.

In some embodiments the storing means comprises an encapsulation header pre-pended to said data packet.

In some embodiments the system comprises a Network Processor.

In some embodiments the system comprises a Field Programmable Gate Array.

In some embodiments the system comprises an Application Specific Integrated Circuit.

In some embodiments the packet router comprises an IP router and said data packet comprises an Internet Protocol (IP) packet.

In some embodiments the packet router comprises an Ethernet router, said data packet comprises an Ethernet packet and said destination address comprises a destination MAC address.

In some embodiments the packet router comprises a Label Switched Router (LSR) and said data packet comprises a Multiprotocol Label Switching (MPLS) packet and said destination address comprises an MPLS label.

Yet another aspect of embodiments of the present invention provide a program storage device readable by a machine, tangibly embodying a program of instructions executable by the machine to perform method steps described above.

BRIEF DESCRIPTION OF THE DRAWINGS

Some embodiments of apparatus and/or methods in accordance with embodiments of the present invention are now described, by way of example only, and with reference to the accompanying drawings in which.

In the figures like features are denoted by like reference characters.

DETAILED DESCRIPTION

In a network processor-based service router, each local IP interface (IF) is bound to a port on an ingress interface card. Incoming IP packets are parsed/classified using network processor filters based on the IP destination address. Packets then undergo IP routing processing on a network processor.

One embodiment comprises storing the source interface information in a storage register associated with the data packet being processed by the network processor. When the packet has been routed, the packet is then sent to the queue set associated with the interface identified by the source interface information stored in the register. In this embodiment, the register is only associated with the packet currently being processed. When the packet arrives at the queue set associated with the appropriate interface, the packet is added to the queue within the queue set, associated with the priority of the packet. The priority of the packet can be defined by Quality of Service (QoS) parameter within the packet, forwarding class (FC) based on the DSCP of the IP packet and ingress IP I/F policy, or other prioritizing mechanism well known to persons of skill in the art.

Figure 1:
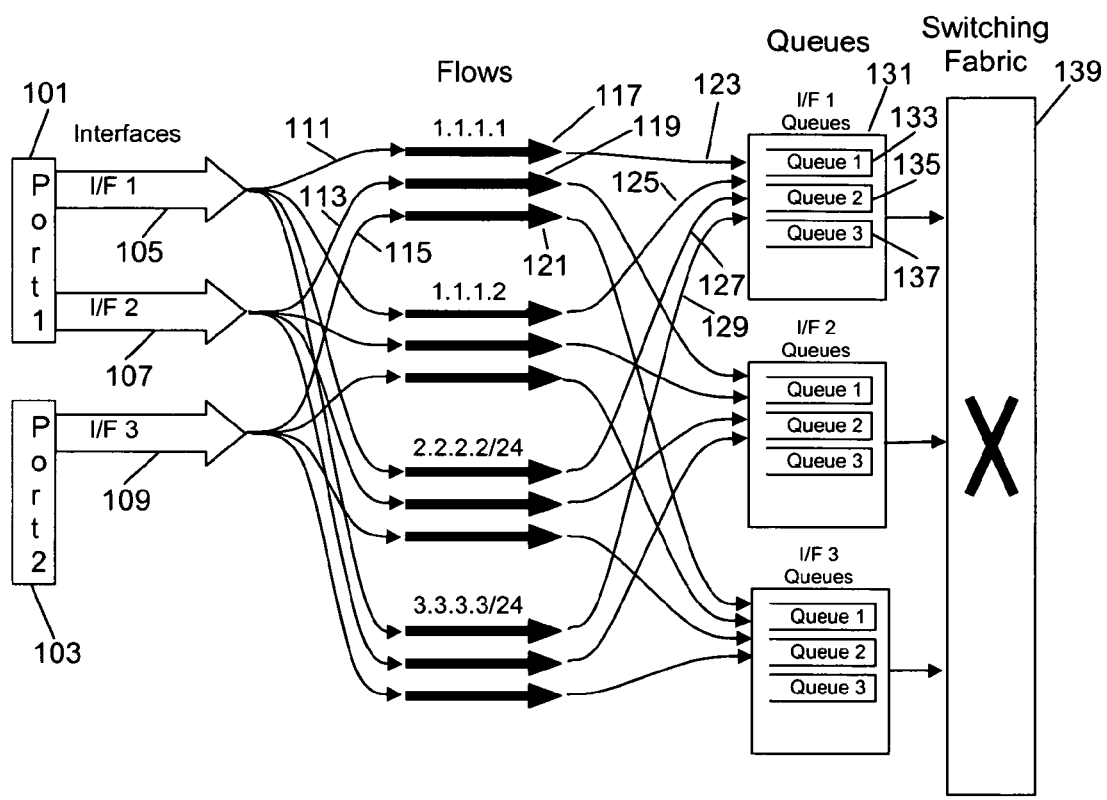
FIG. 1 illustrates a diagrammatic view showing a prior art implementation of source-based queuing in an IP router.
Figure 2:
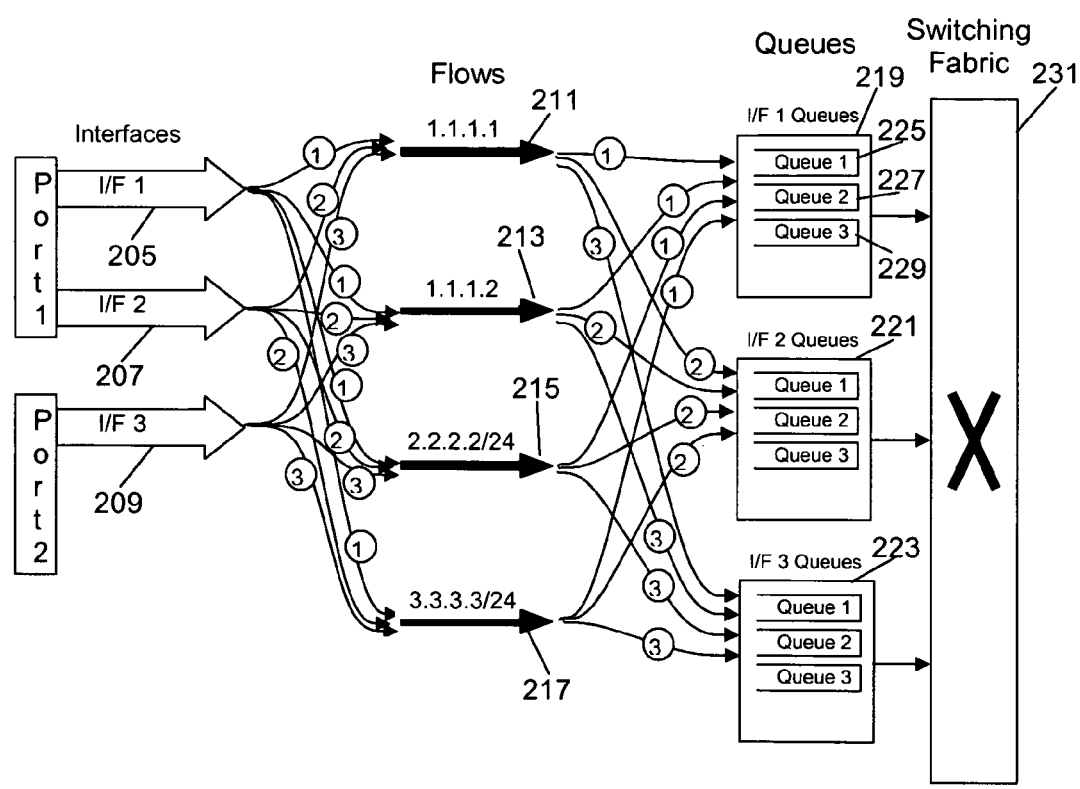
FIG. 2 illustrates a diagrammatic view showing source-based queuing in an IP router in accordance with an embodiment of the present invention.

With reference to FIG. 2, IP packets from ingress interfaces 205, 207, 209 are associated with their originating ingress interface, which is accomplished by storing an identifier for the ingress interface associated with each IP packet as it moves through the flows. This is illustrated conceptually by numbered circles (1), (2), (3) on the curved arrows representing the packets as they move through the router. The numbered circles (1), (2), (3) represent the stored ingress interface identifiers which are associated with the IP packets as they move through flows 211, 213, 215, 217. Each flow handles all of the IP packets associated with a destination IP address. IP packets are forwarded from flows 211, 213, 215, 217 to queue sets 219, 221, 223 be reading the stored ingress interface identifier associated with each IP packet. Queues 225, 227, 229 within queue set 219 are each configured to handle traffic with different priorities. The queues are processed according to the down stream bandwidth through the switching fabric 231.

Figure 3:
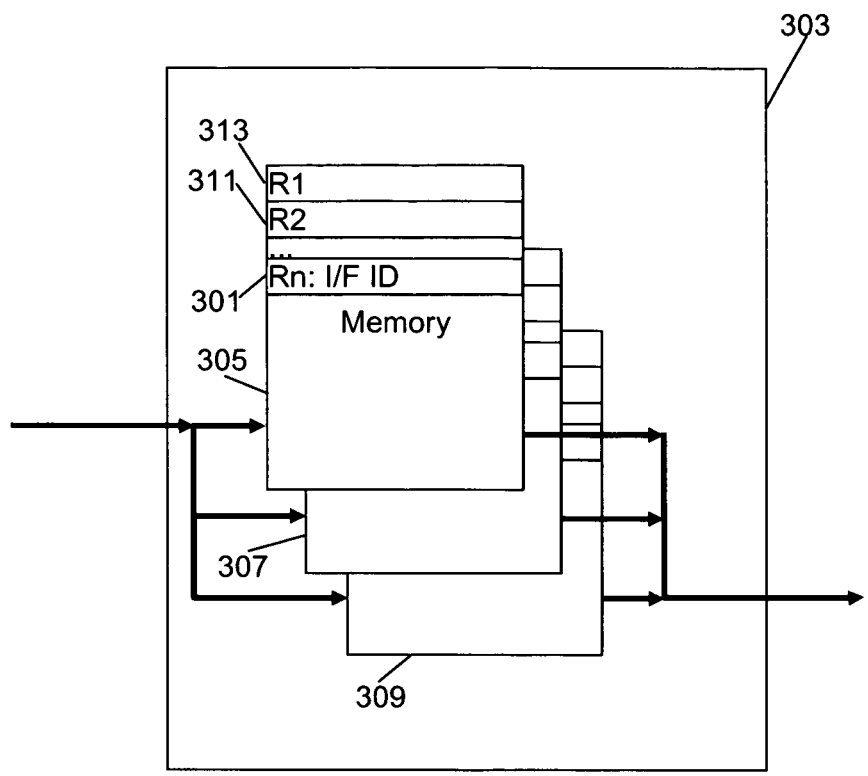
FIG. 3 illustrates aspects of an internal register embodiment the present invention.

FIG. 3 illustrates an embodiment of the present invention in which the ingress interface identifier is stored in a register 301. Network processor 303 has multiple memory blocks 305, 307, 309, each dedicated to one flow, thereby allowing multiple flows to be processed simultaneously. IP packets are processed through each flow, one packet at a time. Registers 301, 311, 313 are assigned to flow 305, and remain associated with flow during the time that the packet is being processed within the flow.

In another embodiment, the ingress interface identifier corresponding to each packet is stored in external memory and associated with the packet explicitly for the duration that the packet is being processed by the flow.

Figure 4:
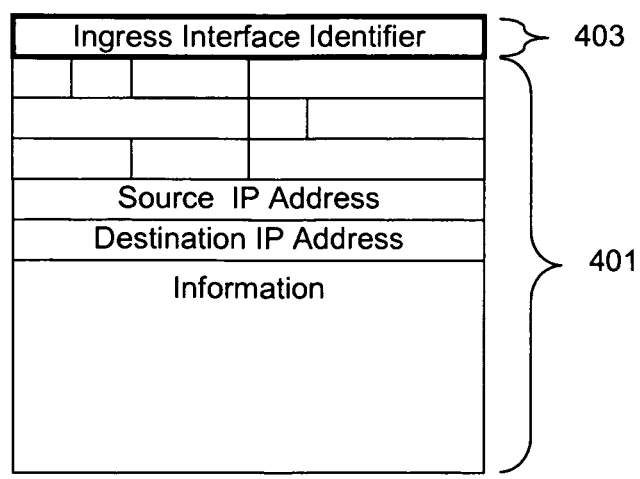
FIG. 4 illustrates a packet encapsulation embodiment of the present invention.

FIG. 4, illustrates another embodiment wherein IP packets that are routable get pre-pended with switching fabric encapsulation headers. Thus each IP packet 401 is pre-pended with an encapsulation header 403, into which the ingress interface identifier corresponding to the packet is stored. This provides a portable storage mechanism for the ingress interface information. Internal field markings within the encapsulation header can be used for additional processing.

Figure 5:
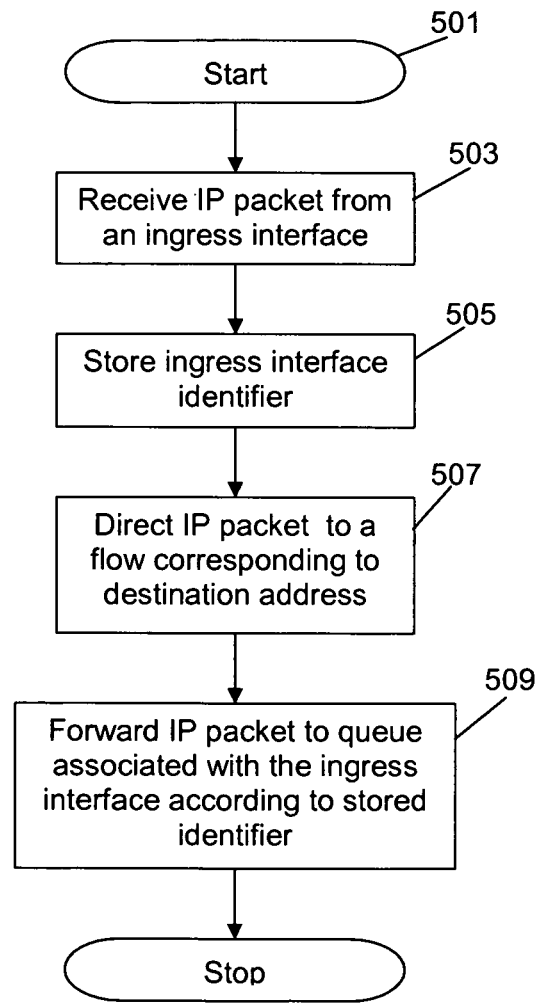
FIG. 5 illustrates steps of an embodiment of a method of the present invention.

FIG. 5 illustrates steps of an embodiment of a method of the present invention which starts at step 501. At step 503 the network processor of the IP router receives an IP packet from an ingress interface. At step 505 the Network Processor stores the ingress interface identifier for the interface in which the packet was received. The processor can store the ingress interface identifier in a number of different ways as discussed previously. Other methods for storing the ingress interface identifier for each packet are also contemplated as would be well understood by persons skilled in the art. At step 507 the IP packet is directed to a flow corresponding to the destination address of the IP packet. The stored identifier is then available for step 509 where the IP packet is forwarded to the queue associated with the ingress interface according to stored identifier. At this point, the identifier is no longer required. In the case of the identifier being stored in an encapsulation header, the header is stripped off after retrieving the identifier.

Note that the preceding description discusses embodiments having an IP router and carrying IP packets. Other embodiments contemplated within the scope of the present invention apply generally to packet routers carrying data packets and also to Ethernet routers, carrying Ethernet packets having destination MAC addresses and to Label Switched Routers (LSR) carrying MultiProtocol Label Switching (MPLS) packets having MPLS labels as destination addresses.

In contrast to prior art approaches of source-based routing, requiring a separate flow for each destination route and each ingress interface, embodiments of the present invention use a single flow for each destination route To illustrate the value of the present invention, consider an IP router having 100 (one hundred) ingress interfaces requiring source-based queuing and 1000 (one thousand) different destination routes or destination addresses. Using a prior art implementation having one flow per ingress interface and per destination route, this would require 100,000 separate flows, whereas embodiments of the present invention would only require 100 flows. In an embodiment using an internal register to store the ingress interface identifier, it would also require one internal register per flow. In typical network processor implementations, each flow would typically have several unused registers assigned and available anyway.

A person of skill in the art would readily recognize that steps of various above-described methods can be performed by programmed computers. Herein, some embodiments are also intended to cover program storage devices, e.g., digital data storage media, which are machine or computer-readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Numerous modifications, variations and adaptations may be made to the embodiment of the invention described above without departing from the scope of the invention, which is defined in the claims.

What is claimed is:

1. A method for selecting queues in a packet router, the method comprising:
    receiving an Internet Protocol (P) packet from an ingress interface, wherein the IP packet occurs on Layer 3 of the Open System Interconnection (OSI) model;
    storing an identifier for said ingress interface associated with said received IP packet in a flow, wherein a single flow respectively corresponds to each destination address;
    directing said received IP packet to the flow according to the destination address of said received IP packet; and
    forwarding said directed IP packet from said flow to a set of queues associated with said ingress interface according to the stored identifier;
    assigning said IP packet to a queue within said set of queues according to a priority of said IP packet, wherein said queue corresponds to said priority.

2. The method of claim 1, wherein said step of storing said identifier comprises:
    storing said identifier in an internal register allocated to said IP packet within said flow.

3. The method of claim 1, wherein said step of storing said identifier comprises:
    storing said identifier in external memory allocated to said IP packet within said flow.

4. The method of claim 1, wherein said step of storing said identifier comprises:
    pre-pending said identifier to said IP packet in an encapsulation header.

5. The method of claim 1, further comprising:
    defining said priority by a Quality of Service (QoS) parameter in said IP packet.

6. The method of claim 1, further comprising:
    defining said priority by a forwarding class parameter in said IP packet.

7. The method of claim 1, further comprising:
    allocating said internal register to said flow while said IP packet is present within said flow.

8. The method of claim 1, wherein said destination address comprises a range of destination addresses.

9. The method of claim 1, wherein said packet router comprises an IP router.

10. A non-transitory storage medium, tangibly embodying a program of instructions executable by a machine to perform the method of claim 1.

11. A system for processing incoming packets in a packet router, the system comprising:
    an ingress interface configured to receive an Internet Protocol (IP) packet, the ingress interface having an ingress interface identifier, wherein the IP packet occurs on Layer 3 of the Open System interconnection (OSI) model;
    a storage mechanism configured to store said ingress interface identifier in association with said IP packet in a flow, wherein a single flow respectively corresponds to each destination route;
    memory blocks, each memory block respectively dedicated to the single flow configured for accepting said IP packet from said interface; and
    a forwarding device configured for forwarding said IP packet from said flow to a set of queues associated with said ingress interface according to the stored identifier;

wherein said forwarding device is configured to assign said IP packet to a queue within said set of queues according to a priority of said IP packet wherein said queue corresponds to said priority.

12. The system of claim 11, wherein said storage mechanism comprises:
   an internal register allocated to said IP packet within said flow.

13. The system of claim 11, wherein said storage mechanism comprises:
   an external memory allocated to said IP packet within said flow.

14. The system of claim 11, wherein said storage mechanism comprises:
   an encapsulation header pre-pended to said IP packet.

15. The system of claim 11, further comprising:
   a network processor.

16. The system of claim 11, further comprising:
   a Field Programmable Gate Array (FPGA).

17. The system of claim 11, further comprising:
   an Application Specific Integrated Circuit (ASIC).

18. The system of claim 11, wherein said packet router comprises an IP router.

\* \* \* \* \*